US011438103B2

United States Patent
Krishna Kumar et al.

(10) Patent No.: US 11,438,103 B2
(45) Date of Patent: Sep. 6, 2022

(54) RECEIVER CAPABILITY AWARE IMPLEMENTATION OF HARQ FEEDBACK

(71) Applicant: QUALCOMM Incorporated, San Diego, CA (US)

(72) Inventors: Raj Kumar Krishna Kumar, Bangalore (IN); Rohit Kapoor, Bangalore (IN); Yatiraj Paniyoor Tantri, Bangalore (IN); Balaji Nagarajan, Nagavarapalya (IN); Abhijit Bhattacharya, Bangalore (IN); Padmanabhan Venkataraman Karthic, Chennai (IN); Kundan Kumar Lucky, Bangalore (IN); Venkatesh Bhat, Bangalore (IN); Chiranthan Purushotham, Bangalore (IN); Siju Kurian, Chennai (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/144,689

(22) Filed: Jan. 8, 2021

(65) Prior Publication Data

US 2022/0224448 A1 Jul. 14, 2022

(51) Int. Cl.
*H04W 8/24* (2009.01)
*H04L 1/18* (2006.01)
*H04W 80/02* (2009.01)

(52) U.S. Cl.
CPC ............ *H04L 1/1816* (2013.01); *H04L 1/189* (2013.01); *H04L 1/1835* (2013.01); *H04W 80/02* (2013.01)

(58) Field of Classification Search
CPC ... H04L 5/0055; H04L 1/1812; H04L 1/1864; H04L 1/1896; H04W 72/042
See application file for complete search history.

(56) References Cited

U.S. PATENT DOCUMENTS

2016/0072612 A1* 3/2016 Seo ........................... H04L 1/22
370/329
2021/0083807 A1* 3/2021 Duan .................... H04L 1/1825

* cited by examiner

*Primary Examiner* — Jamal Javaid
(74) *Attorney, Agent, or Firm* — Patterson+ Sheridan, L.L.P.

(57) ABSTRACT

Certain aspects of the present disclosure provide techniques for sending a retransmission of codewords of a data packet to a receiver node, that were not previously successfully received by the receiver node, in a manner compatible with a receive capability constraint of the receiver node.

25 Claims, 15 Drawing Sheets

RECEIVER CAPABILITY AWARE IMPLEMENTATION OF HARQ FEEDBACK

BACKGROUND

Field of the Disclosure

Aspects of the present disclosure relate to wireless communications and, more particularly, to management of hybrid automatic repeat request (HARQ) feedback and data retransmission operations based on a receive capability constraint of a receiver node.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

Systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for management of hybrid automatic repeat request (HARQ) feedback and data retransmission operations based on a receive capability constraint of a receiver node.

Certain aspects of the subject matter described in this disclosure can be implemented in a method for wireless communication by a transmitter node. The method may include obtaining an indication of at least a receive capability constraint of a receiver node. The method may further include initially transmitting a packet to the receiver node within a transmit opportunity. The method may further include receiving a HARQ feedback indicating at least one or more codewords of the packet were not successfully received by the receiver node. The method may further include retransmitting within the same transmit opportunity at least the one or more codewords of the packet that were not successfully received by the receiver node. The method may further include taking one or more actions to ensure that an over the air (OTA) time duration of the retransmission is compatible with the receive capability constraint of the receiver node.

Certain aspects of the subject matter described in this disclosure can be implemented in a method for wireless communication by a receiver node. The method may include transmitting to a transmitter node an indication of at least one receive capability constraint of the receiver node. The method may further include receiving from the transmitter node an initial transmission of a packet within a transmit opportunity. The method may further include transmitting a HARQ feedback indicating one or more codewords of the packet that were not successfully received by the receiver node. The method may further include receiving a retransmission of, within the same transmit opportunity, at least the one or more codewords of the packet that were not successfully received by the receiver node transmitted in a manner compatible with the receive capability constraint of the receiver node.

Certain aspects of the subject matter described in this disclosure can be implemented by a transmitter node. The transmitter node may include a receiver configured to receive an indication of at least a receive capability constraint of a receiver node; a transmitter configured to initially transmit a packet to the receiver node within a transmit opportunity, wherein the receiver is further configured to receive a hybrid automatic repeat request (HARQ) feedback indicating, at least, one or more codewords of the packet were not successfully received by the receiver node and the transmitter is further configured to retransmit, within the same transmit opportunity, at least the one or more codewords of the packet that were not successfully received by the receiver node; and a processing system configured to take one or more actions to ensure that an over the air (OTA) time duration of the retransmission is compatible with the receive capability constraint of the receiver node.

Certain aspects of the subject matter described in this disclosure can be implemented in a receiver node. The receiver node may include a transmitter configured to transmit, to a transmitter node, an indication of at least one receive capability constraint of the receiver node; and a receiver configured to receive, from the transmitter node, an initial transmission of a packet within a transmit opportunity, wherein the transmitter is further configured to transmit a hybrid automatic repeat request (HARQ) feedback indicating one or more codewords of the packet that were not successfully received by the receiver node, and the receiver is further configured to receive a retransmission of, within the same transmit opportunity, at least the one or more codewords of the packet that were not successfully received by the receiver node transmitted in a manner compatible with the receive capability constraint of the receiver node.

Aspects of the present disclosure provide wireless nodes such as transmitter node and receiver node, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
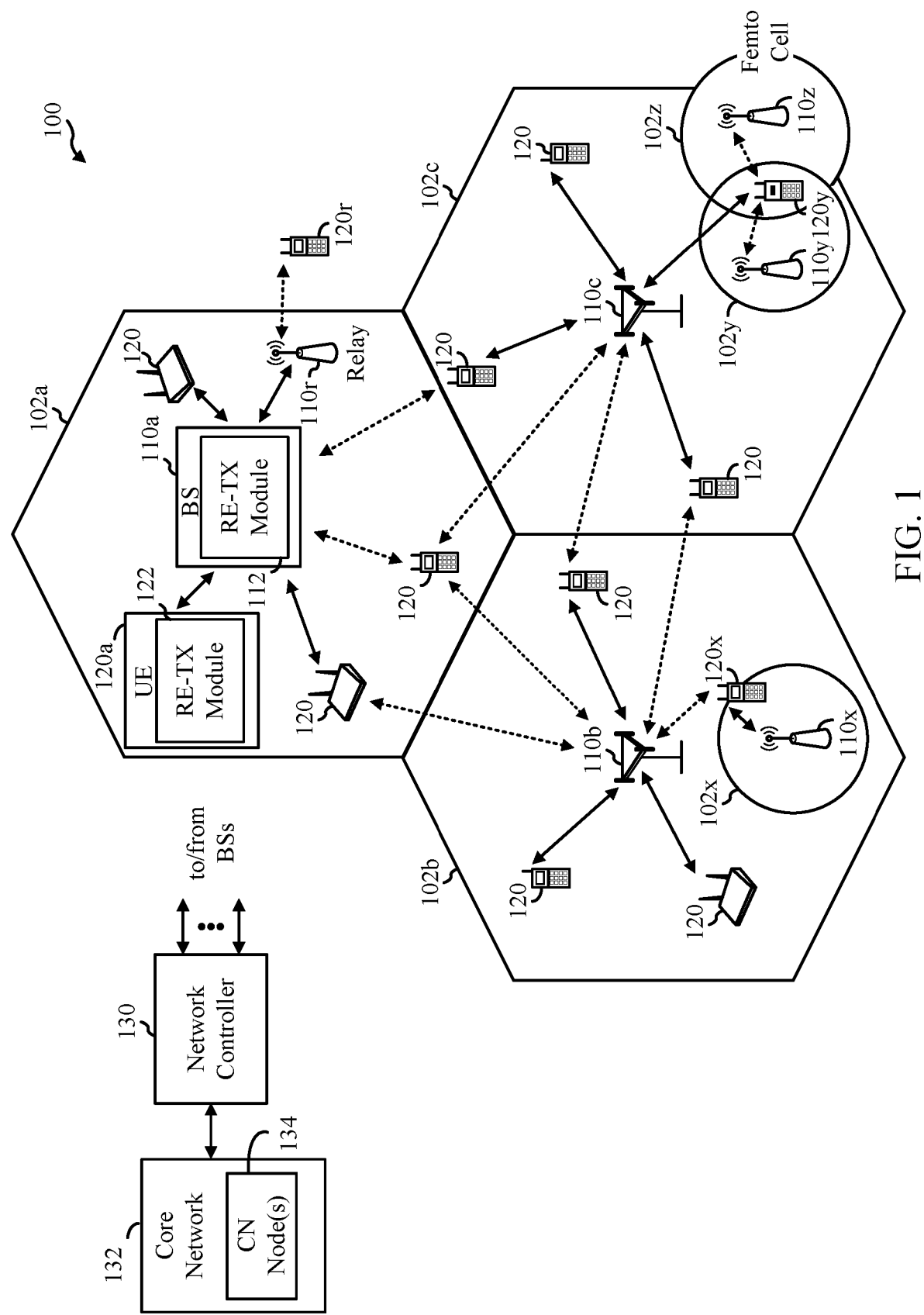
FIG. 1 is a block diagram conceptually illustrating an example wireless communication network, in accordance with certain aspects of the present disclosure.

Aspects of the present disclosure provide apparatus, methods, processing systems, and computer readable mediums for sending a retransmission of failed codewords of a data packet to a receiver node, that were not previously successfully received by the receiver node, in a manner compatible with a receive capability constraint of the receiver node. A size of retransmitted codewords is long enough to ensure that the receiver node can successfully decode these retransmitted codewords and send back an acknowledgement (ACK) signal within a short inter-frame space (SIFS) time. Also, to maximize spectral efficiency, retransmissions that are heavily punctured (i.e., short over the air (OTA) time duration data packets) may be sent by a transmitter node to the receiver node. In one example, a node may be a base station (BS). In another example, the node may be a user equipment (UE).

The following description provides examples of hybrid automatic repeat request (HARQ) feedback and data retransmission operations in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

Example Telecommunications System

FIG. 1 illustrates an example wireless communication network 100, in which aspects of the present disclosure may be practiced. The wireless communication network 100 may include one or more base stations (BSs) 110a (with a RE-TX module 112) configured to perform operations 600 of FIG. 6 and/or operations 700 of FIG. 7. The wireless communication network 100 may further include one or more user equipments (UEs) 120a (with a retransmission (RE-TX) module 122) configured to perform operations 600 of FIG. 6 and/or operations 700 of FIG. 7.

The wireless communication network 100 is in communication with a core network 132. The core network 132 is in communication with the one or more BSs 110 that and/or the one or more UEs 120 in the wireless communication network 100, via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other B Ss or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 may communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

The network controller 130 may be in communication with a set of BSs 110 and provide coordination and control for these BSs 110 (e.g., via a backhaul). In aspects, the network controller 130 may be in communication with the core network 132 (e.g., a 5G Core Network (5GC)), which provides various network functions such as access and mobility management, session management, user plane function, policy control function, authentication server function, unified data management, application function, network exposure function, network repository function, network slice selection function, etc.

The wireless communication network 100 may include relay stations (not shown). A relay station is a station that receives a transmission of data and/or other information from an upstream station (e.g., the BS 110 or the UE 120) and sends a transmission of the data and/or other information to a downstream station (e.g., the UE 120 or the BS 110). The relay station may also be the UE 120 that relays transmissions for other UEs 120. In the example shown in FIG. 1, a relay station may communicate with the BS 110a and a UE 120r in order to facilitate communication between the BS 110a and the UE 120r. The relay station may also be referred to as an IAB node, a relay AP, a relay, etc.

The wireless communication network 100 may be a heterogeneous network that includes BSs 110 of different types, e.g., macro AP, pico AP, femto AP, relays, etc. These different types of BSs 110 may have different transmit power levels, different coverage areas, and different impact on interference in the wireless communication network 100. For example, the macro AP may have a high transmit power level (e.g., 20 Watts) whereas the pico AP, the femto AP, and the relays may have a lower transmit power level (e.g., 1 Watt).

The wireless communication network 100 may support synchronous or asynchronous operation. For synchronous operation, the BSs 110 may have similar frame timing, and transmissions from the different BSs 110 may be approximately aligned in time. For asynchronous operation, the BSs 110 may have different frame timing, and transmissions from the different BSs 110 may not be aligned in time. The techniques described herein may be used for both synchronous and asynchronous operation.

Figure 2:
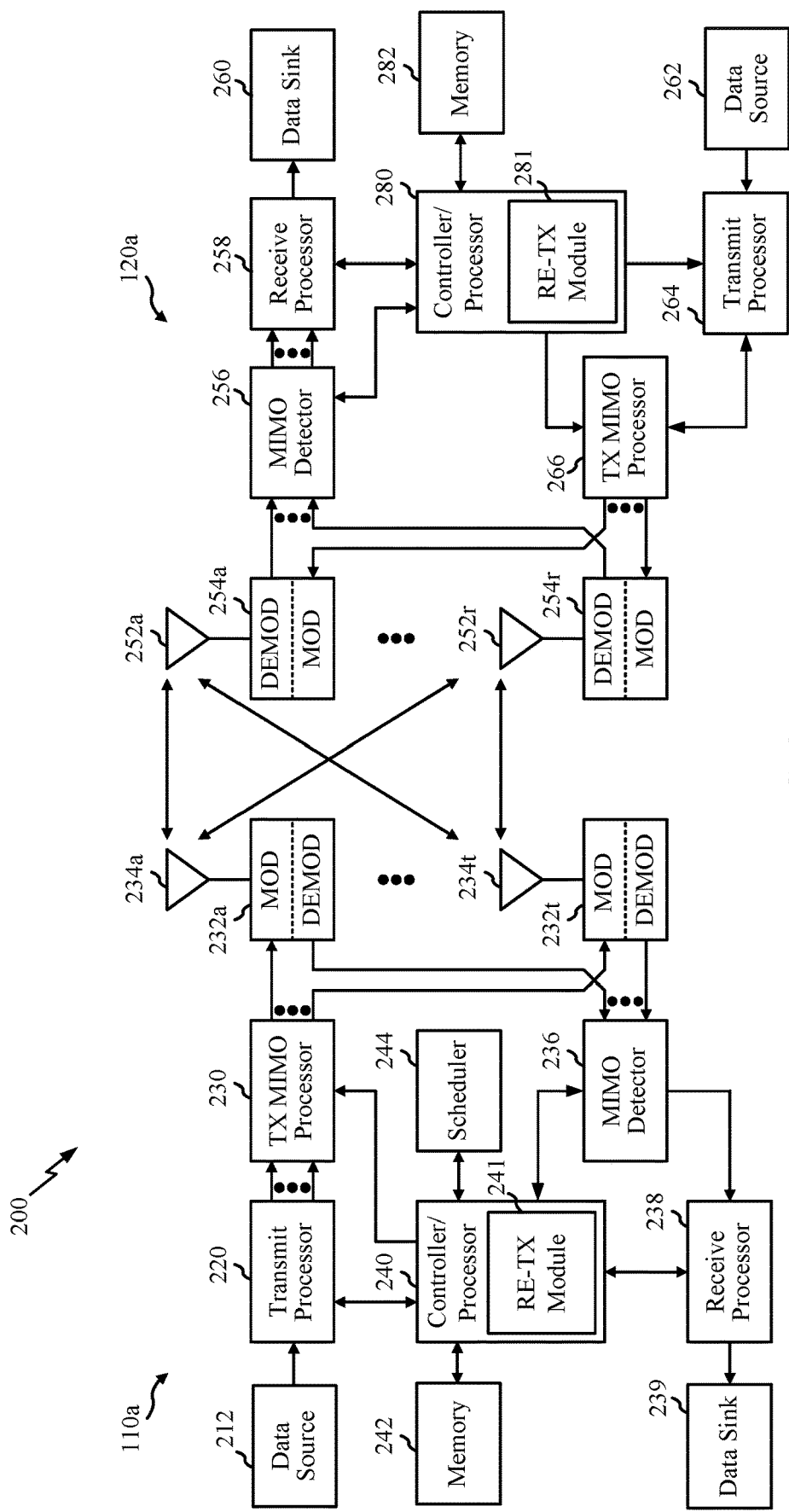
FIG. 2 is a block diagram conceptually illustrating a design of an example base station (B S) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. The downlink signals from the MODs in transceivers 232a-232t may be transmitted via antennas 234a-234t, respectively.

At the UE 120a, antennas 252a-252r may receive the downlink signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MEMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at the UE 120a, a transmit processor 264 may receive and process data (e.g., for a physical uplink shared channel (PUSCH)) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110 and the UE 120, respectively. A scheduler 244 may schedule the UEs for 120 data transmission on a downlink and/or an uplink.

Antennas 252, processors 266, 258, 264, and/or controller/processor 280 of the UE 120a and/or antennas 234, processors 220, 230, 238, and/or controller/processor 240 of the BS 110a may be used to perform various techniques and methods described herein for retransmission of codewords of a packet to a receiver node that were not successfully received by the receiver node based on a receive capability constraint of the receiver node. For example, as shown in FIG. 2, the controller/processor 240 of the BS 110a includes a RE-TX module 241 that may be configured to perform the operations illustrated in FIG. 6 and/or FIG. 7, as well as other operations disclosed herein for retransmission of the codewords of the packet to the receiver node that were not successfully received by the receiver node based on the receive capability constraint of the receiver node, in accordance with aspects of the present disclosure. As shown in FIG. 2, the controller/processor 280 of the UE 120a includes a RE-TX module 281 that may be configured to perform the operations illustrated in FIG. 6 and/or FIG. 7, as well as other operations disclosed herein for retransmission of the codewords of the packet to the receiver node that were not successfully received by the receiver node based on the receive capability constraint of the receiver node, in accordance with aspects of the present disclosure. Although shown at the controller/processor, other components of the UE 120a and the BS 110a may be used performing the operations described herein.

NR may utilize orthogonal frequency division multiplexing (OFDM) with a cyclic prefix (CP) on the uplink and downlink NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
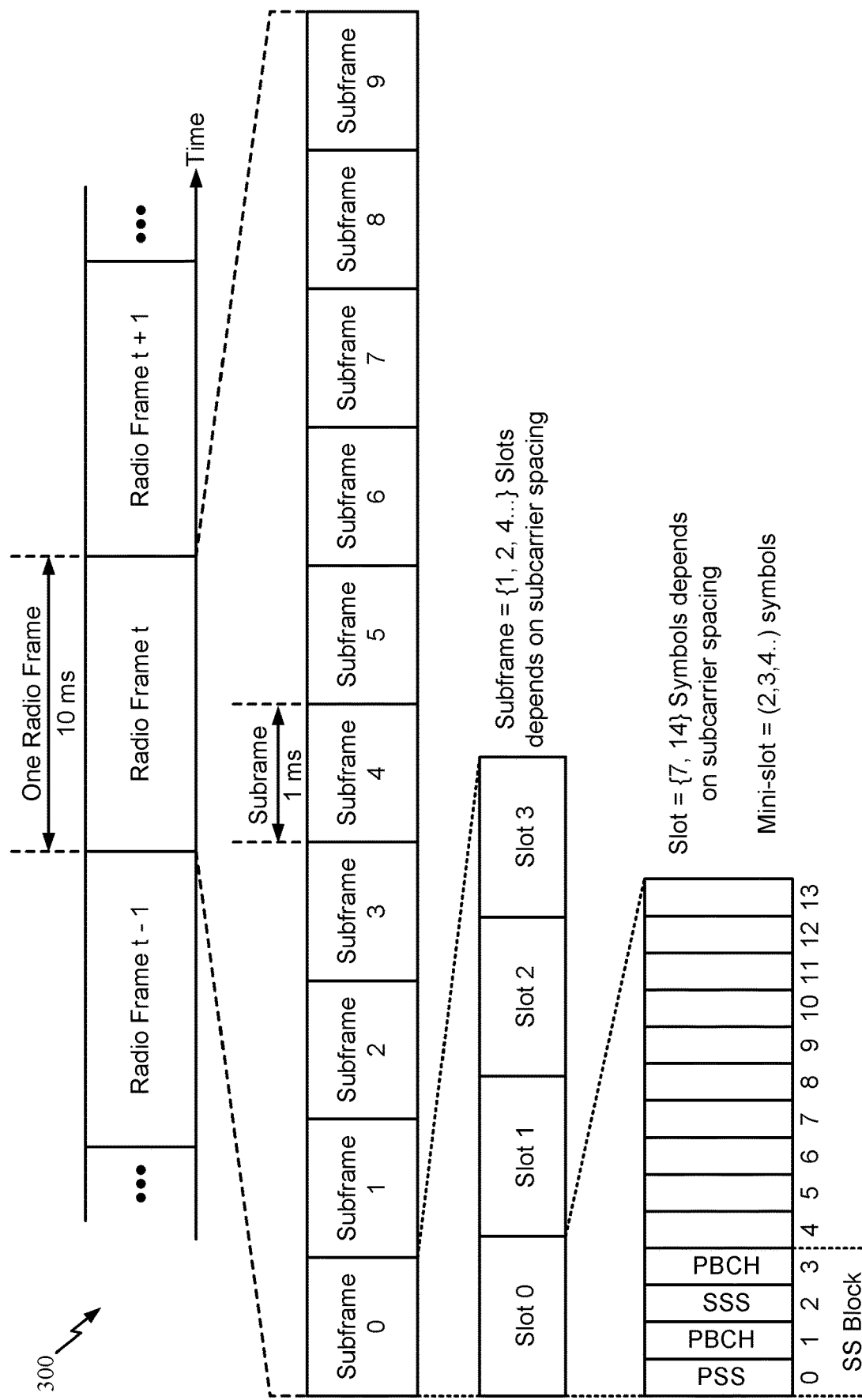
FIG. 3 is an example frame format for certain wireless communication systems (e.g., a new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, ... slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

The SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may broadcast both SSB and remaining minimum system information (RMSI), for example, with SIB1 and SIB2. A non-standalone cell may only broadcast SSB, without broadcasting RMSI. In a single carrier in NR, multiple SSBs may be sent in different frequencies, and may include the different types of SSB.

Example Receiver Capability Aware Implementation of HARQ Feedback

Figure 4:
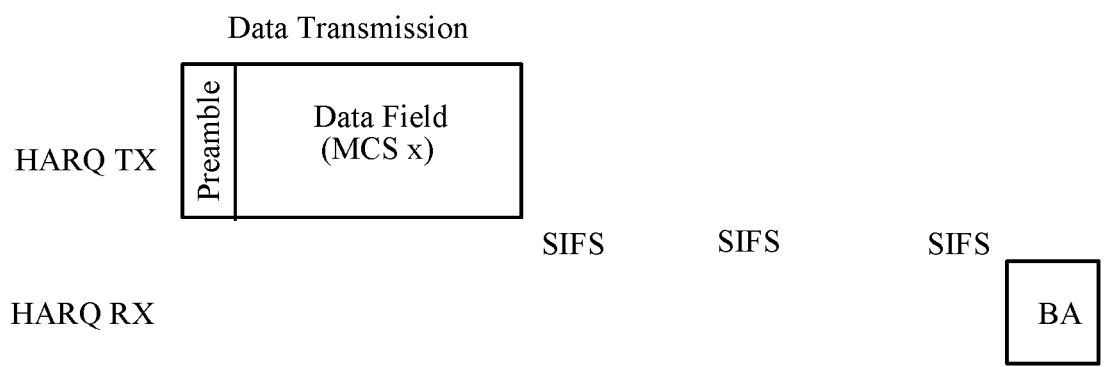
FIG. 4 illustrates an example communication scheme between a transmitter node and a receiver mode, in accordance with certain aspects of the present disclosure.

Communications between wireless nodes may include use of various feedback signaling. One form of feedback is block acknowledgment (BA). As illustrated in FIG. 4, BA is provided by a receiver node to a transmitter node, and may include one acknowledgement for received media access control (MAC) protocol data units (MPDUs) (i.e., frames). The frames are associated with a short inter-frame space (SIFS), which may indicate a time from an end of a last symbol of a previous frame to a beginning of a first symbol of a preamble of a subsequent frame as seen at a receiving interface.

Another form of feedback is a hybrid automatic repeat request (HARQ) feedback. The HARQ feedback may be provided by the receiver node to the transmitter node, and may include transmission of several reporting signals to the transmitter node. Example reporting signals may include acknowledgement (ACK) signals representing an ACK state, and negative acknowledgement (NACK) signals representing a NACK state. An ACK signal may be transmitted as part of the HARQ feedback in response to successful reception and decoding of an initial transmission (e.g., a data packet). A NACK signal may be transmitted as part of the HARQ feedback in response to a reception of an initial transmission but an unsuccessful decoding of at least a portion of the initial transmission. The NACK signal may indicate some codewords of the data packet that were not successfully decoded by the receiver node.

Figure 5:
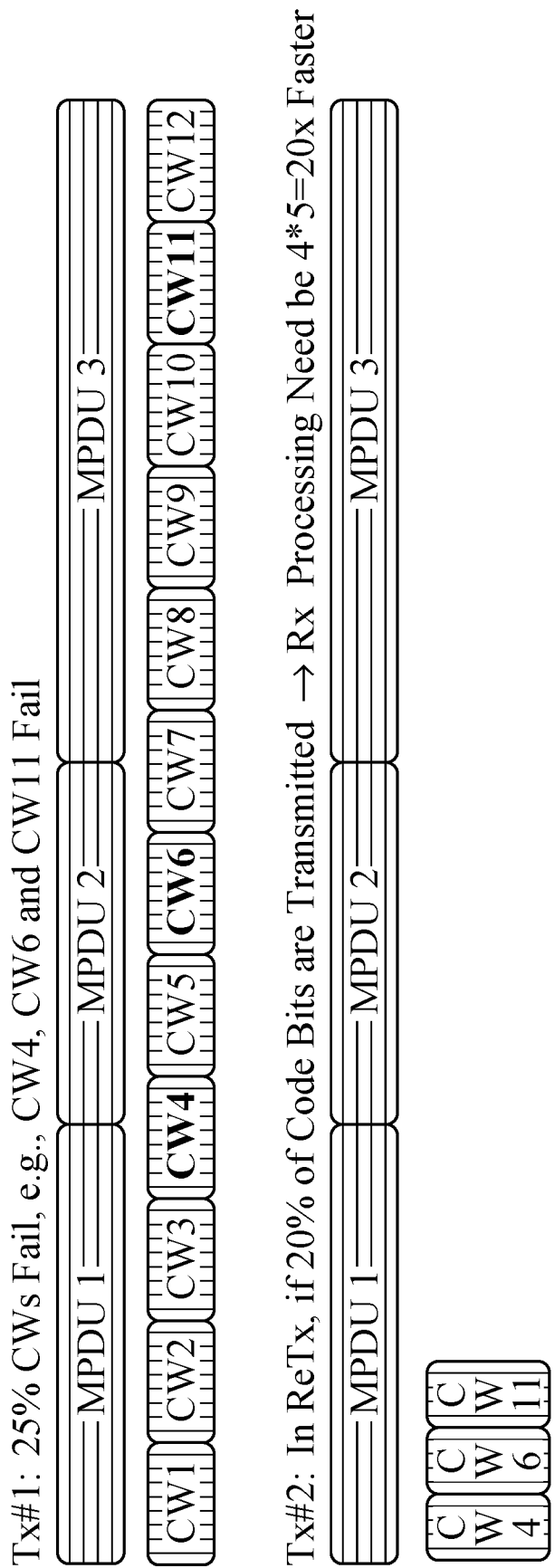
FIG. 5 illustrates example data transmission and retransmission operations between a transmitter node and a receiver mode, in accordance with certain aspects of the present disclosure.

As illustrated in FIG. 5, when a receiver node is unable to receive some codewords (such as CW4, CW6, and CW11) sent in an initial transmission (including three MPDUs and multiple codewords in each MPDU) and then sends a NACK signal indicating these failed codewords to a transmitter node, the transmitter node may have to send back these failed codewords to the receiver node. If the transmitter node may only send these failed codewords (for example, 20% of code bits) in a retransmission to the receiver node, then a processing speed at the receiver node may have to be much faster (for example, 4*5=20× faster). This may increase receiver node complexity.

Examples of retransmission blocks, which may need to be able to process faster to meet block-ACK timelines after the retransmission may include a low-density parity-check (LDPC) decoder bandwidth, a memory access speed, and/or a medium access control (MAC) processing time. The LDPC decoder bandwidth may correspond that a number of codewords should be within a peak LPDC decoder capability. The memory access speed may correspond that initial transmission and retransmission of logarithmic likelihood ratios (LLRs) must meet the timeline. The MAC processing time may correspond that MAC peak processing bandwidth should meet the timeline.

Accordingly, what is needed are techniques and apparatus for the retransmission of the failed codewords to the receiver node without increasing the receiver node complexity.

Aspects of the present disclosure relate to wireless communications, and more particularly, to techniques for a retransmission of failed codewords to a receiver node that were not successfully received by the receiver node within a same transmit opportunity, which is associated with an initial transmission of codewords to the receiver node. In the retransmission, a size of retransmitted codewords is configured such that the receiver node can successfully receive and decode the retransmitted codewords and send back an ACK signal within a SIFS time. Also, to maximize spectral efficiency, retransmissions that are heavily punctured (i.e., short over the air (OTA) time duration data packets) may be sent by a transmitter node to the receiver node. These techniques may apply to extremely high throughput (EHT) standards and Wi-Fi applications.

Figure 6:
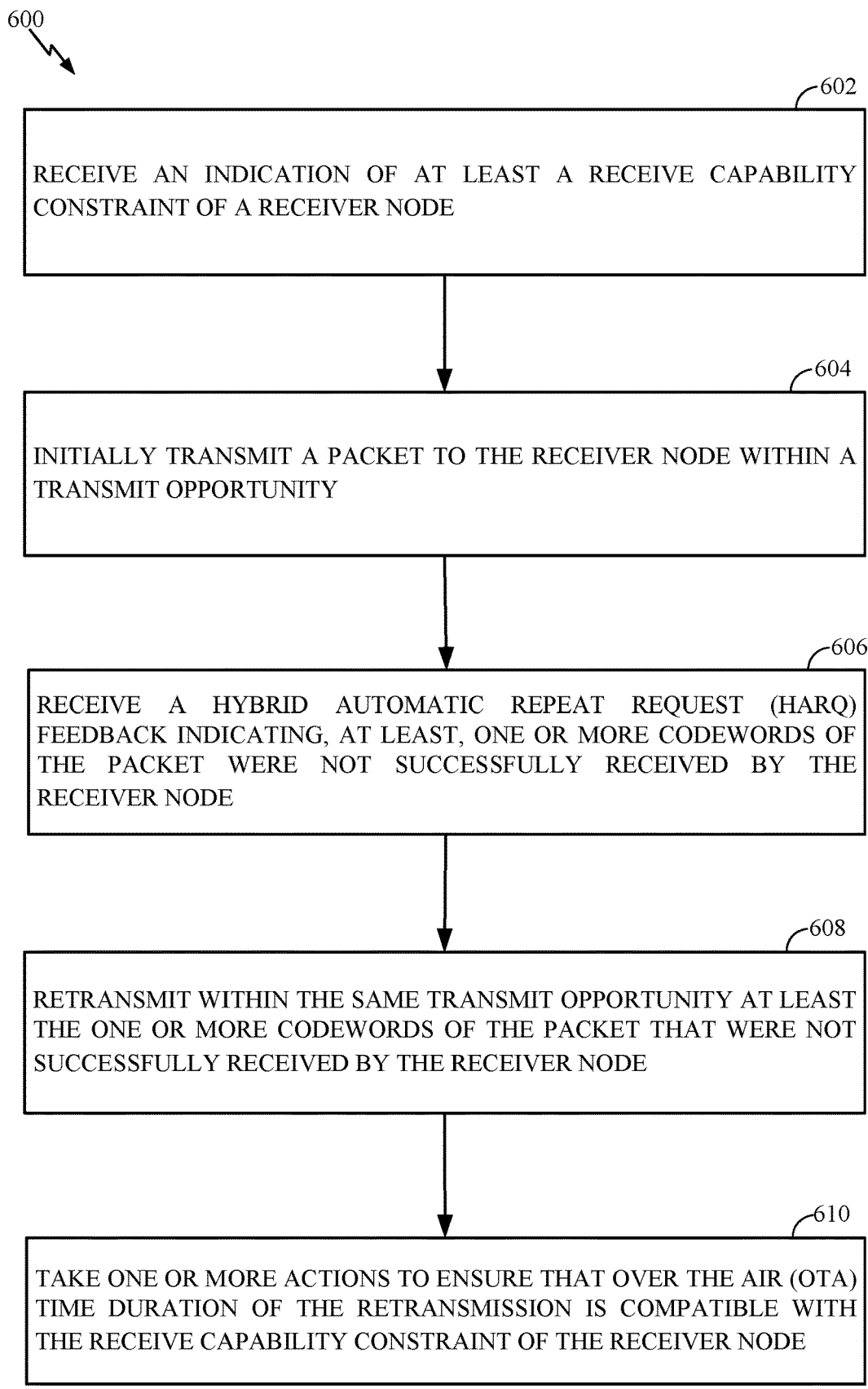
FIG. 6 is a flow diagram illustrating example operations for wireless communication by a transmitter node, in accordance with certain aspects of the present disclosure.

FIG. 6 is a flow diagram illustrating example operations 600 for wireless communication. Operations 600 may be performed by a transmitter node (e.g., such as the BS 110a in FIG. 1 or FIG. 2) to ensure that an OTA time duration of a retransmission is compatible with a receive capability constraint of a receiver node, in accordance with aspects of the present disclosure.

Operations 600 begin, at 602, by obtaining an indication of at least a receive capability constraint of a receiver node. In certain aspects, the transmitter node obtains the configuration using a processor of the BS 110a shown in FIG. 1 or FIG. 2 and/or of the apparatus shown in FIG. 14.

At 604, the transmitter node initially transmits a packet to the receiver node within a transmit opportunity. In certain aspects, the transmitter node transmits this packet using antenna(s) and receiver/transceiver components of the BS 110a shown in FIG. 1 or FIG. 2 and/or of the apparatus shown in FIG. 14.

At 606, the transmitter node receives a HARQ feedback indicating at least one or more codewords of the packet were not successfully received by the receiver node. In certain aspects, the transmitter node receives this HARQ feedback using antenna(s) and receiver/transceiver components of the BS 110a shown in FIG. 1 or FIG. 2 and/or of the apparatus shown in FIG. 14.

At 608, the transmitter node retransmits to the receiver node within the same transmit opportunity at least the one or more codewords of the packet that were not successfully received by the receiver node. In certain aspects, the transmitter node retransmits these one or more codewords using antenna(s) and receiver/transceiver components of the BS 110a shown in FIG. 1 or FIG. 2 and/or of the apparatus shown in FIG. 14.

At 610, the transmitter node takes one or more actions to ensure that an OTA time duration of the retransmission to the receiver node is compatible with the receive capability constraint of the receiver node. In certain aspects, the transmitter node takes these actions using a processor of the BS 110a shown in FIG. 1 or FIG. 2 and/or of the apparatus shown in FIG. 14.

Figure 7:
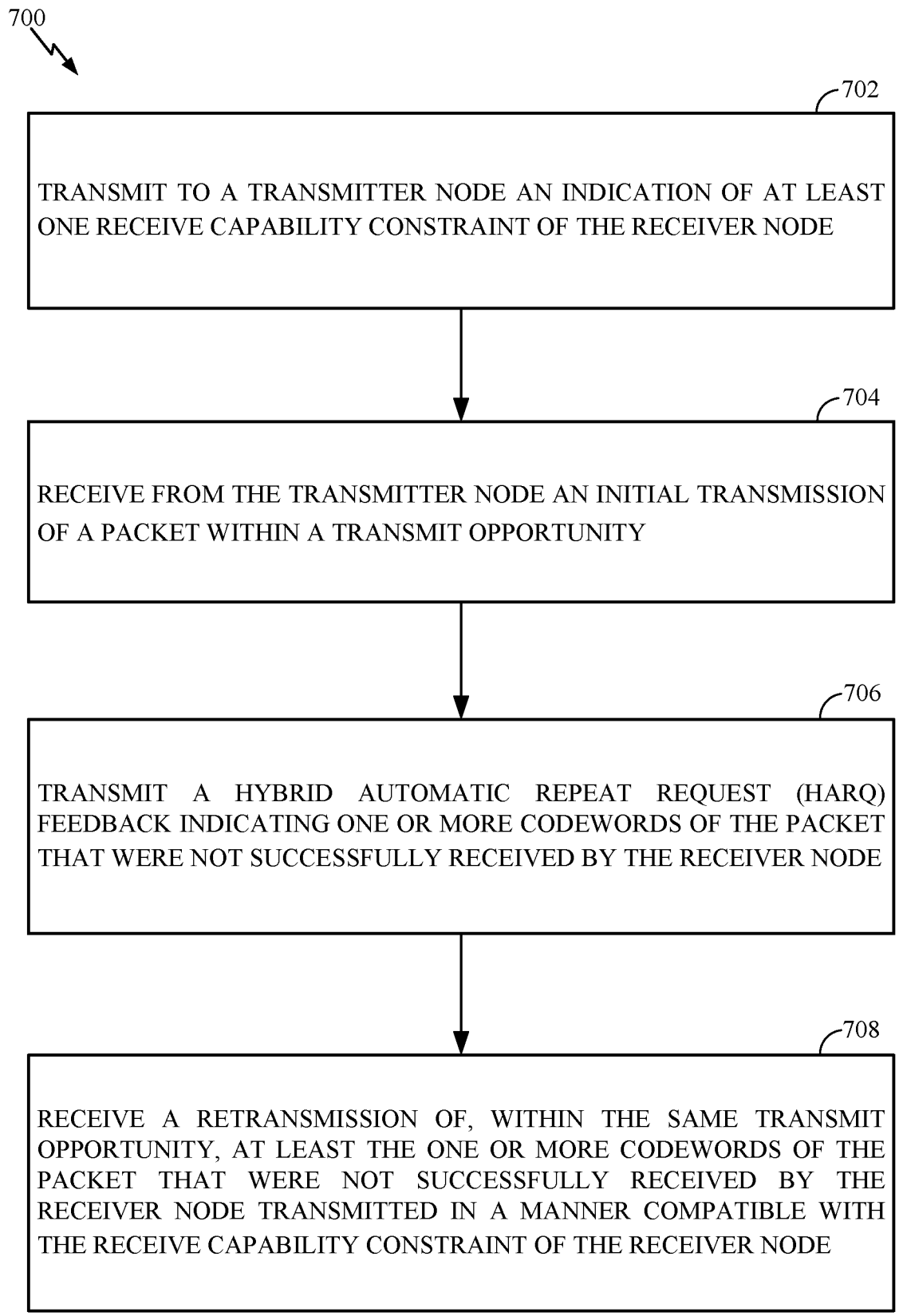
FIG. 7 is a flow diagram illustrating example operations for wireless communication by a receiver node, in accordance with certain aspects of the present disclosure.

FIG. 7 is a flow diagram illustrating example operations 700 for wireless communication that may be considered complementary to operations 600 of FIG. 6. For example, operations 700 may be performed by a receiver node (e.g., such as the BS 110a in FIG. 1 or FIG. 2) that sends an indication of a receive capability constraint to a transmitter node, which enables the transmitter node to perform operations 600 of FIG. 6.

Operations 700 begin, at 702, by transmitting to a transmitter node an indication of at least one receive capability constraint of the receiver node. In certain aspects, the receiver node transmits this indication using antenna(s) and receiver/transceiver components of the BS 110a shown in FIG. 1 or FIG. 2 and/or of the apparatus shown in FIG. 15.

At 704, the receiver node receives from the transmitter node an initial transmission of a packet within a transmit opportunity. In certain aspects, the receiver node receives this initial transmission using antenna(s) and receiver/transceiver components of the BS 110a shown in FIG. 1 or FIG. 2 and/or of the apparatus shown in FIG. 15.

At 706, the receiver node transmits to the transmitter node a HARQ feedback indicating one or more codewords of the packet that were not successfully received by the receiver node. In certain aspects, the receiver node transmits this HARQ feedback using antenna(s) and receiver/transceiver components of the BS 110a shown in FIG. 1 or FIG. 2 and/or of the apparatus shown in FIG. 15.

At 708, the receiver node receives a retransmission of, within the same transmit opportunity, at least the one or more codewords of the packet that were not successfully received by the receiver node from the transmitter node transmitted in a manner compatible with the receive capability constraint of the receiver node. In certain aspects, the receiver node receives this retransmission using antenna(s) and receiver/transceiver components of the BS 110a shown in FIG. 1 or FIG. 2 and/or of the apparatus shown in FIG. 15.

Operations 600 and 700 shown in FIGS. 6 and 7 are further described with reference to FIGS. 8-13.

Figure 8:
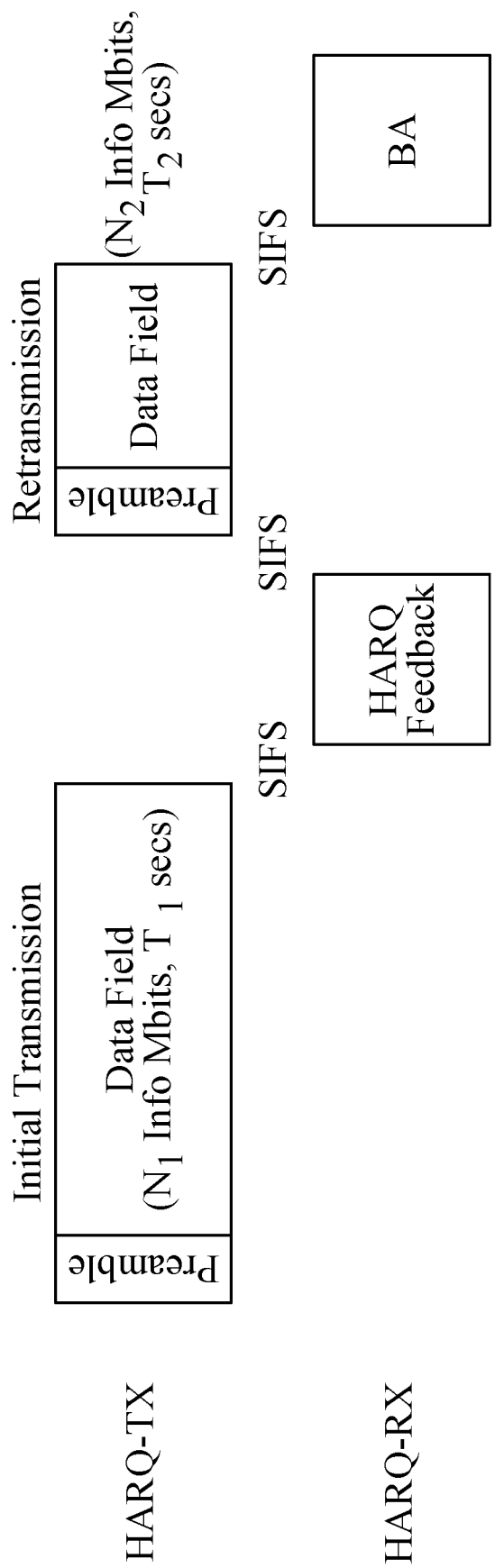
FIGS. 8-13 illustrate example communication schemes between a transmitter node and a receiver mode, in accordance with certain aspects of the present disclosure.

FIG. 8 illustrates a communication scheme between a transmitter device and a receiver device. Prior to any communication between the transmitter device and the receiver device, the transmitter device and the receiver device may have a capability exchange. The capability exchange may indicate a receive capability constraint of the receiver node. The receive capability constraint may include a receive throughput.

The receive throughput may be agreed between the transmitter node and the receiver node based on a LDPC decoder throughput, a double data rate (DDR) memory read/write throughput, and/or a MAC processing time. In certain aspects, the receive throughput may be based on a block (such as the LDPC decoder throughput), which may have a most restrictive throughput limitation. In one example, a receive throughput may be based on a LDPC decoder throughput, and a rate (of R Megabits per second (Mbps)) for the LDPC decoder throughput may be agreed between a transmitter node and a receiver node. This R Mbps LDPC decoder may turn around ACK/NACK signals for all data packets at a rate less than or equal to R within a SIFS from an end of a data packet.

The transmitter node may send an initial transmission to the receiver node based on the receive capability constraint. The initial transmission may include a data packet. The data packet may include a preamble and a data field. The data field may correspond to codewords (in a payload size of $N_1$ in Mbits) and an OTA time duration (in $T_1$ seconds). The data packet may be sent to the receiver node within a transmit opportunity such that the OTA time duration of this initial transmission is compatible with the receive capability constraint.

The receiver node may not be able to successfully receive all the codewords of the data packet. The receiver node may then generate a HARQ feedback, which may indicate all failed codewords that were not successfully received. The receiver node may send the HARQ feedback to the transmitter node.

The transmitter node may receive and decode the HARQ feedback. The transmitter node may determine to retransmit the failed codewords indicated within the HARQ feedback. The transmitter node may select transmission parameters for retransmission of the failed codewords. In one example, the transmission parameters may be selected based on the receive throughput. In another example, the transmission parameters may be selected based on a number of information bits corresponding to the failed codewords that have to be retransmitted. In one example, the selected transmission parameters may include a modulation and coding scheme (MCS). This MCS may be different from a MCS associated with an initial transmission. In another example, the selected transmission parameters may include rate matching parameters.

The transmitter node may retransmit a sufficient number of encoded bits (having a payload size of $N_2$ in Mbits) associated with the failed codewords indicated within the HARQ feedback to the receiver node, within the same transmit opportunity, based on the selected transmission parameters, such that a throughput associated with this retransmission does not exceed the agreed receive throughput. In one example, a rate of the throughput associated with this retransmission rate ($R_i=N_i/T_i$) may be less than or equal to R Mbps for i=1,2. Also, an OTA time duration (in $T_2$ seconds) of this retransmission may be greater than or equal to $N_2/R$ by retransmitting the sufficient number of encoded bits (i.e., choosing $N_2$ large enough through rate-matching).

Figure 9:
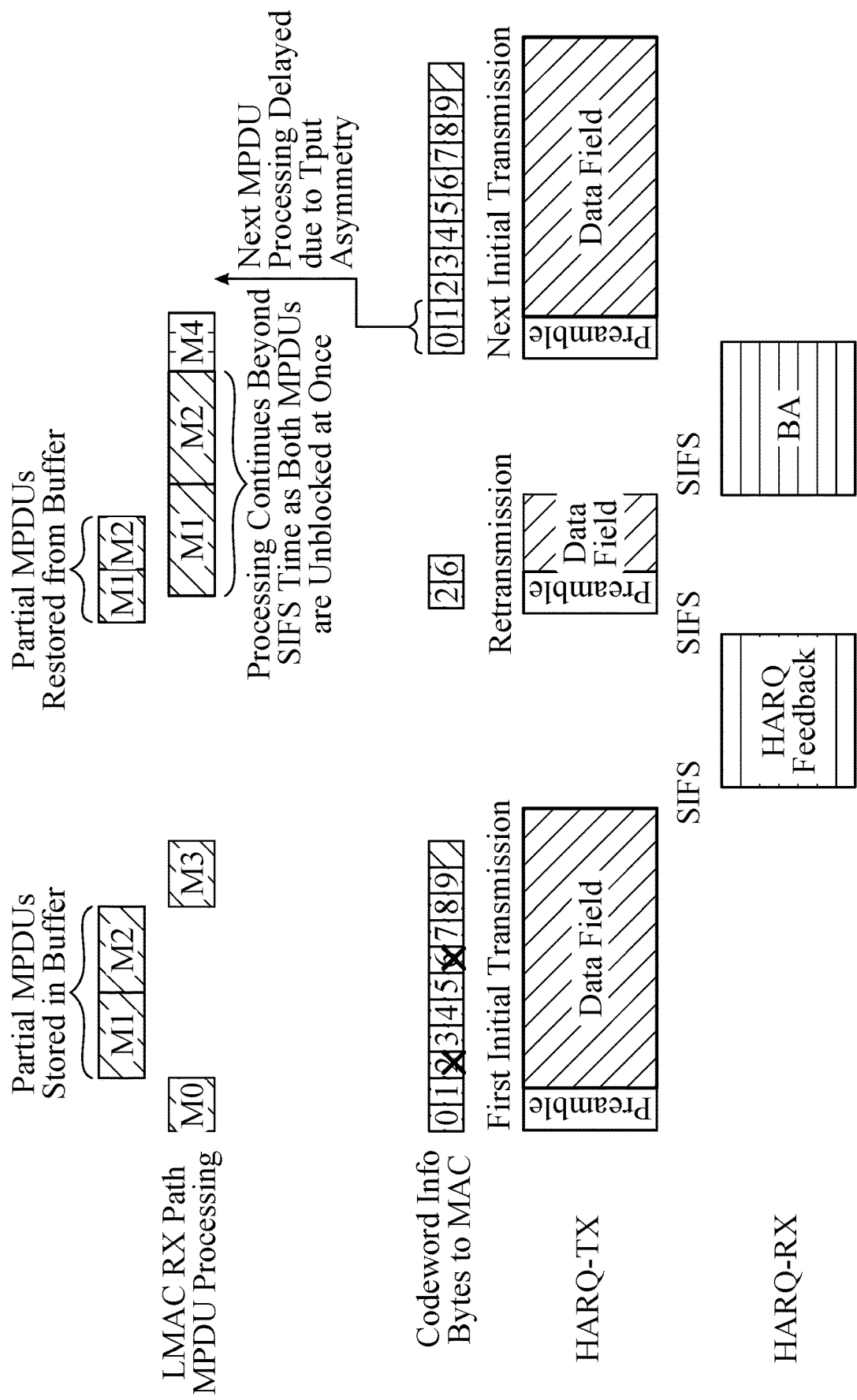

As illustrated in FIG. 9, when a receiver node may fail to decode some codewords (such as codeword 2 and codeword 6) received in a first initial transmission, the receiver node may store LLRs of failed codewords. A MAC of the receiver node may store partially decoded bytes of MPDUs from other successfully received codewords. The receiver node may send a HARQ feedback indicating the failed codewords to a transmitter node within a SIFS time.

The transmitter node may send a retransmission including the failed codewords. The receiver node may perform LLR-based decoding to decode these retransmitted codewords and send them to the MAC. The MAC processes corresponding MPDUs of the retransmitted codewords and send back a BA to the transmitter node.

In certain aspects, upon retransmission of the failed codewords, SIFS turnaround time of the BA is achieved by inferring MPDU cyclic redundancy check (CRCs) from retransmitted codewords CRCs. In certain aspects, the retransmitted codewords may unblock multiple MPDUs at once at the MAC. The MAC processing time of these MPDUs may then continue beyond a SIFS time. When the MAC processing time exceeds OTA time of the retransmission, next initial transmission processing may be delayed. To avoid such delays, the transmitter node is configured to send initial transmissions and/or retransmissions based on MAC processing information such as MAC peak throughput capability information.

Figure 10:
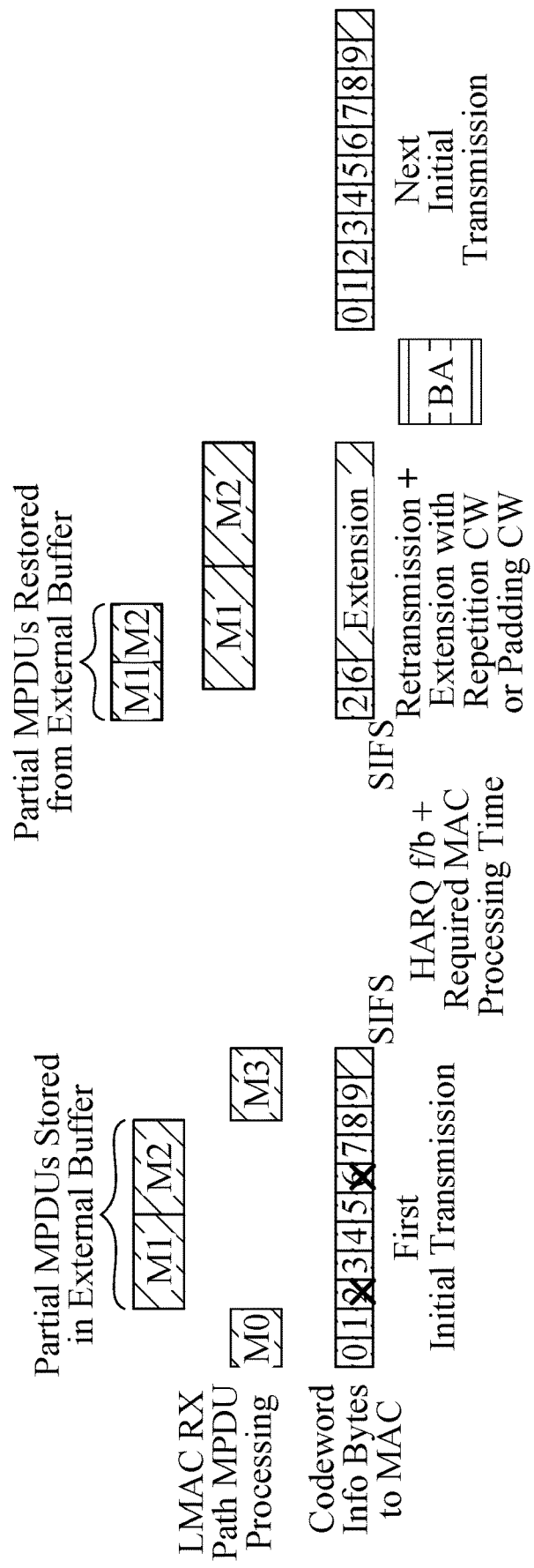

As illustrated in FIG. 10, a transmitter node may obtain a MAC processing time from a receiver node.

In certain aspects, the transmitter node may receive the MAC processing time via an explicit signaling from the receiver node. In some cases, this explicit signaling may be sent along with a HARQ feedback.

In certain aspects, the transmitter node may derive the MAC processing time. For example, the transmitter node may receive a peak MAC processing rate (in Mbps) during the capability exchange between the transmitter node and the receiver node. The transmitter node may further receive a MAC protocol data unit (MPDU)-level block acknowledgment (BA) bitmap. The transmitter node may derive the MAC processing time based on the peak MAC processing rate and/or the MPDU-level BA bitmap.

In certain aspects, the MAC processing time may be equal to a sum of a total size of failed MPDUs in an initial transmission and a size of a first failed codeword in the initial transmission, which is divided by a peak MAC processing rate (in Mbps). The total size of failed MPDUs may be equal to a sum of partial MPDU bytes stored in a DDR memory along with a size of all failed codewords.

The transmitter node may adjust an OTA time duration of a retransmission of one or more failed codewords to the receiver node based on the MAC processing time. This adjustment of the OTA time duration to meet a processing time constraint associated with the MAC processing time may be performed in multiple ways.

In one example, the transmitter node may add parity bits to the failed codewords in the retransmission. This may spread out the failed codewords that are being retransmitted to meet the processing time constraint associated with the MAC processing time.

In another example, the transmitter node may repeat the failed codewords in the retransmission. This may assist in decoding these retransmitted codewords when operating at a lower peak rate.

In another example, the transmitter node may include in the retransmission some codewords that were successfully received by the receiver node as indicated by the HARQ feedback along with the failed codewords. The transmitter node may first include the failed codewords and then other codewords in such retransmission so that there is a maximum amount of time available for processing the failed codewords.

In another example, the transmitter node may include some dummy codewords along with the failed codewords in the retransmission. When some dummy codewords are included in the retransmission, the transmitter node may indicate a number of the dummy codewords included in the retransmission in a header of the retransmission. The transmitter node may first include the failed codewords and then the dummy codewords in such retransmission so that there is a maximum amount of time available for processing the failed codewords.

In certain aspects, the retransmission based on the MAC processing time may result in a timely (or "just-in-time") retransmission processing that may not cause any delay for processing of a next initial transmission and a minimal on-chip buffer requirement.

Figure 11:
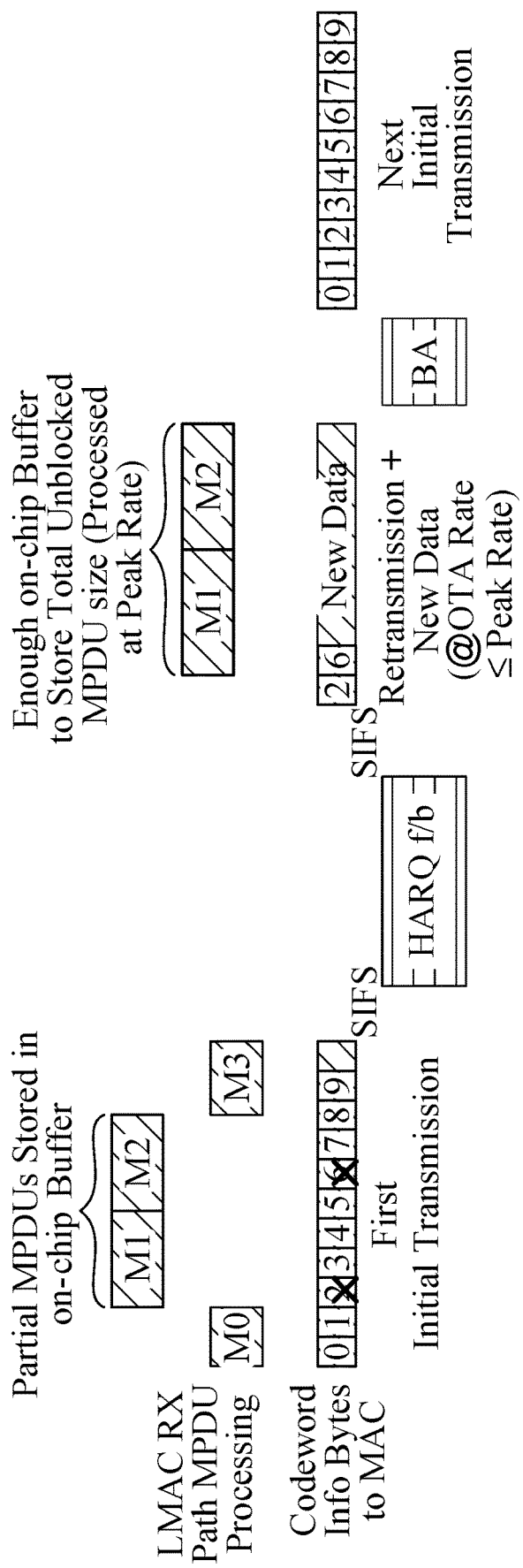

As illustrated in FIG. 11, a transmitted node may include new data along with failed codewords in a retransmission to a receiver node. If the receiver node may receive this new data prior to completion of processing of the failed codewords, the new data may be stored in an on-chip buffer/memory of the receiver node. In one example, an incoming data rate should be equal to or less than a peak processing rate at the receiver node multiplied by one and divided by a worst case puncturing rate for the new data. In another example, a processing rate from the on-chip buffer is equal to the peak processing rate.

The on-chip buffer may store partial MPDUs. The on-chip buffer may also store and process unblocked MPDUs. A size of typical unblocked MPDUs may be evaluated based on unblocked MPDU size statistics. This evaluation may also account for worst-case puncturing for the new data added in the retransmission. In one example, a size of the on-chip buffer may be equal to a size of total failed MPDUs multiplied by one and divided by a worst case puncturing rate.

When the size of unblocked MPDUs may exceed a buffer capacity of the on-chip buffer, the receiver node may send a BA to the transmitter node. Otherwise the receiver node may send a HARQ feedback to the transmitter node. The transmitter node may receive the BA, and interpret the BA as a request to perform an automatic repeat request (ARQ).

In certain aspects, a sufficient on-chip buffer may enable the new data to be appended to the retransmission. In addition, there is no need for explicit signaling to be defined in a specification. Also, there is no power and latency impact for DDR read/write operations of the partial MPDUs.

Figure 12:
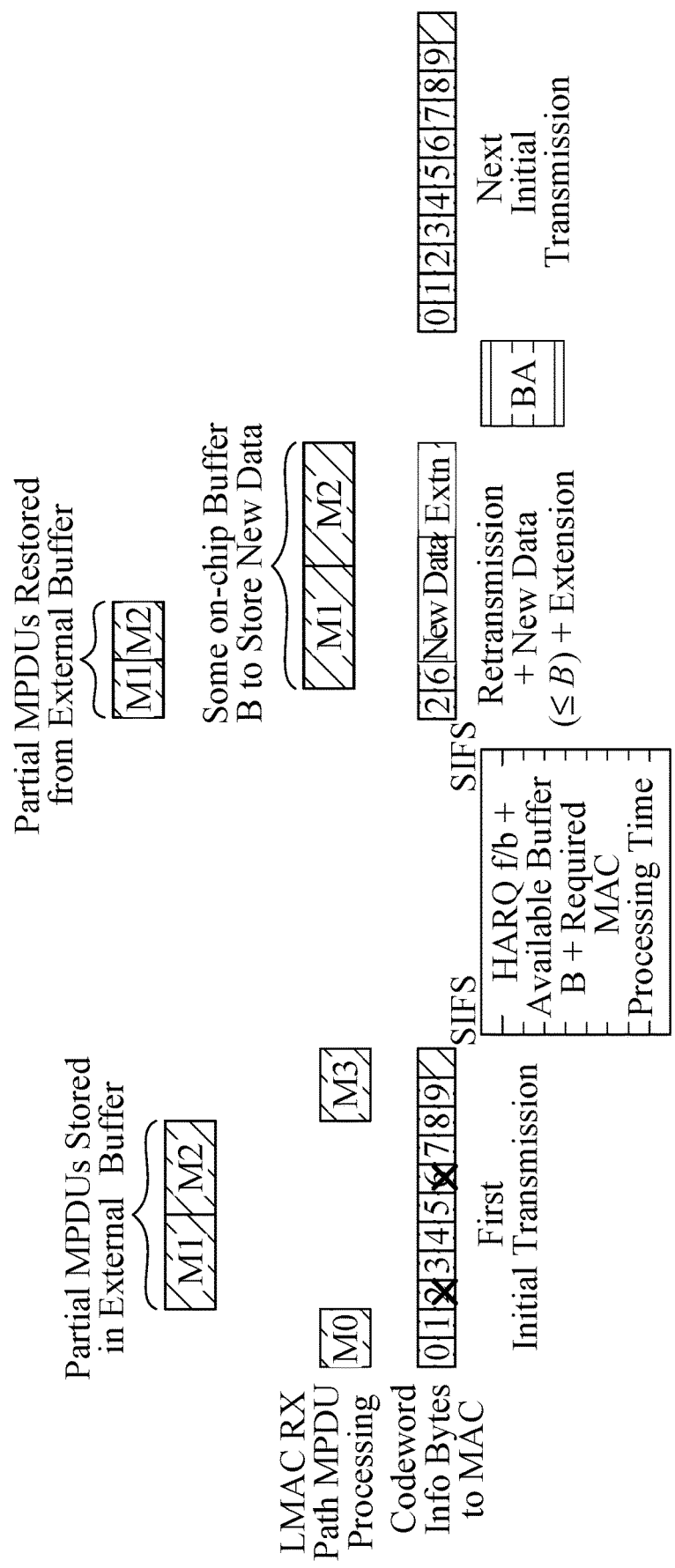

As illustrated in FIG. 12, a transmitted node may receive a MAC processing time and a maximum size of new data that the transmitter node is allowed to include in a retransmission, from a receiver node. The transmitter node may send the retransmission to the receiver node based on this received information. For example, the new data included in the retransmission may be within the maximum size limit. In another example, a sum of an OTA time of the retransmission (including the new data and failed codewords), extension, SIFS, and BA may equal to or greater than a processing time of the retransmission at the receiver node.

In certain aspects, the transmitter node may receive a buffer size or buffer capability of an on-chip buffer/memory of the receiver node from the receiver node. The transmitter node may send the retransmission in a subsequent transmit opportunity and ensure that the retransmission comply with the buffer size. In one example, when a size of the new data that was sent in a previous retransmission is B1 and a buffer size is B, the transmitter node may use a puncturing ratio of greater than or equal to B1/B for a new transmission.

In certain aspects, the retransmission based on the MAC processing time and the maximum size of new data may result in a timely retransmission processing, an efficient use of the on-chip buffer, adding of the new data in the retransmission, an efficient medium utilization, and no restriction on HARQ opportunities.

Figure 13:
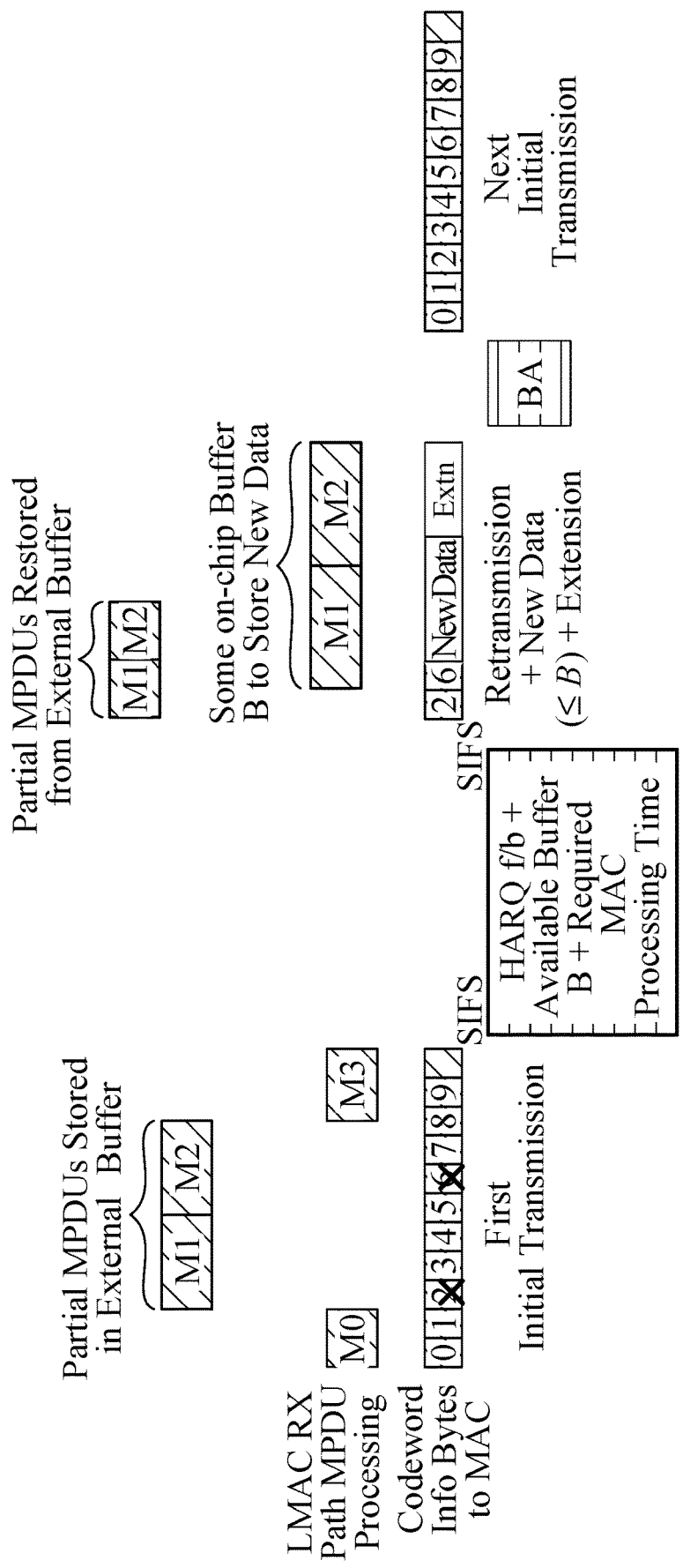

As illustrated in FIG. 13, a receiver node may store LLRs of failed codewords of a packet in an on-chip buffer/memory of the receiver node. The receiver node may take one or more actions if a size of the stored LLRs of the failed codewords may be equal to or exceed a buffer size of the on-chip buffer. In one example, the action may include storing excess LLRs in a memory other than the on-chip buffer. The receiver node may fetch these excess LLRs from the memory during the processing of a retransmission. In another example, the action may include a sending a BA indicating the failed codewords instead of a HARQ feedback.

In certain aspects, a provision of an additional on-chip buffer to store the LLRs of the failed codewords may result in no additional power for memory read/write operations of the failed codewords.

Figure 14:
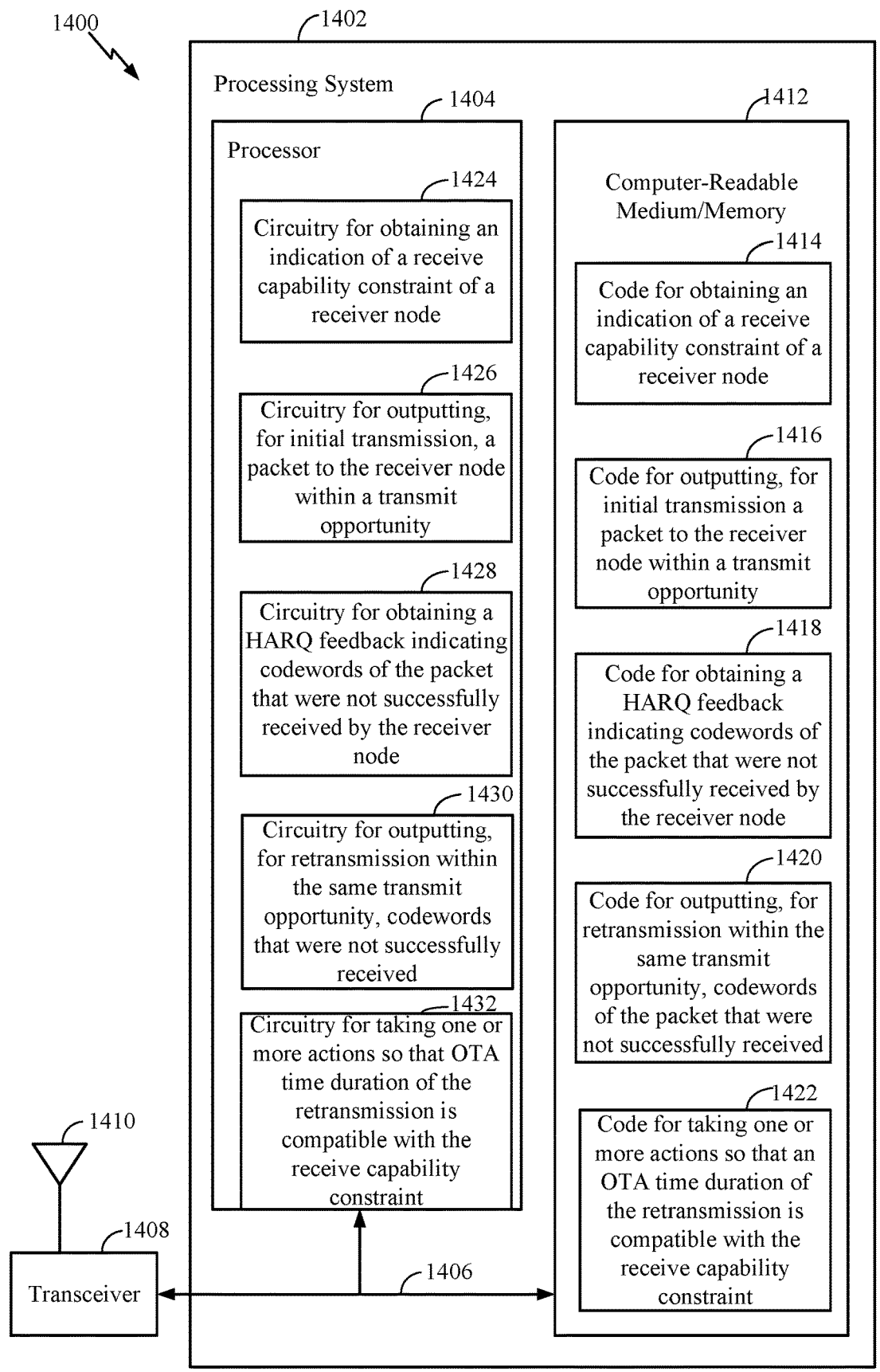
FIG. 14 illustrates a communications device that may include various components configured to perform operations for techniques disclosed herein, in accordance with aspects of the present disclosure.

FIG. 14 illustrates a communications device 1400 that may include various components (e.g., corresponding to means-plus-function components) configured to perform operations for techniques disclosed herein, such as the operations illustrated in FIG. 6. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 6, or other operations for performing the various techniques discussed herein for retransmission of codewords of a packet that were not successfully received by a receiver node based on a receive capability constraint of the receiver node. In certain aspects, computer-readable medium/memory 1412 stores code 1414 for obtaining, code 1416 for outputting, for transmission, and code 1418 for obtaining, code 1420 for outputting, for retransmission, and code 1422 for taking one or more actions. The code 1414 for obtaining may include code for obtaining an indication of at least a receive capability constraint of a receiver node. The code 1416 for outputting, for transmission, may include code for outputting, for initial transmission, a packet to the receiver node within a transmit opportunity. The code 1418 for obtaining may include code for obtaining a HARQ feedback indicating, at least, one or more codewords of the packet were not successfully received by the receiver node. The code 1420 for outputting, for retransmission, may include code for outputting, for retransmission within the same transmit opportunity, at least the one or more codewords of the packet that were not successfully received by the receiver node. The code 1422 for taking one or more actions for code for taking one or more actions to ensure that an OTA time duration of the retransmission is compatible with the receive capability constraint of the receiver node.

The processor 1414 may include circuitry configured to implement the code stored in the computer-readable medium/memory 1412, such as for performing the operations illustrated in FIG. 6, as well as other operations for performing the various techniques discussed herein for retransmission of codewords of a packet that were not successfully received by a receiver node based on a receive capability constraint of the receiver node. For example, the processor 1404 includes circuitry 1424 for obtaining, circuitry 1426 for outputting, for transmission, circuitry 1428 for obtaining, circuitry 1430 for outputting, for retransmission, and circuitry 1432 for taking actions. The circuitry 1424 for obtaining may include circuitry for obtaining an indication of at least a receive capability constraint of a receiver node. The circuitry 1426 for outputting, for transmission may include circuitry for outputting, for initial transmission, a packet to the receiver node within a transmit opportunity. The circuitry 1428 for obtaining may include circuitry for obtaining a HARQ feedback indicating, at least, one or more codewords of the packet were not successfully received by the receiver node. The circuitry 1430 for outputting, for retransmission may include circuitry for outputting, for retransmission within the same transmit opportunity at least the one or more codewords of the packet that were not successfully received by the receiver node. The circuitry 1432 for taking actions for circuitry for taking one or more actions to ensure that an OTA time duration of the retransmission is compatible with the receive capability constraint of the receiver node.

Figure 15:
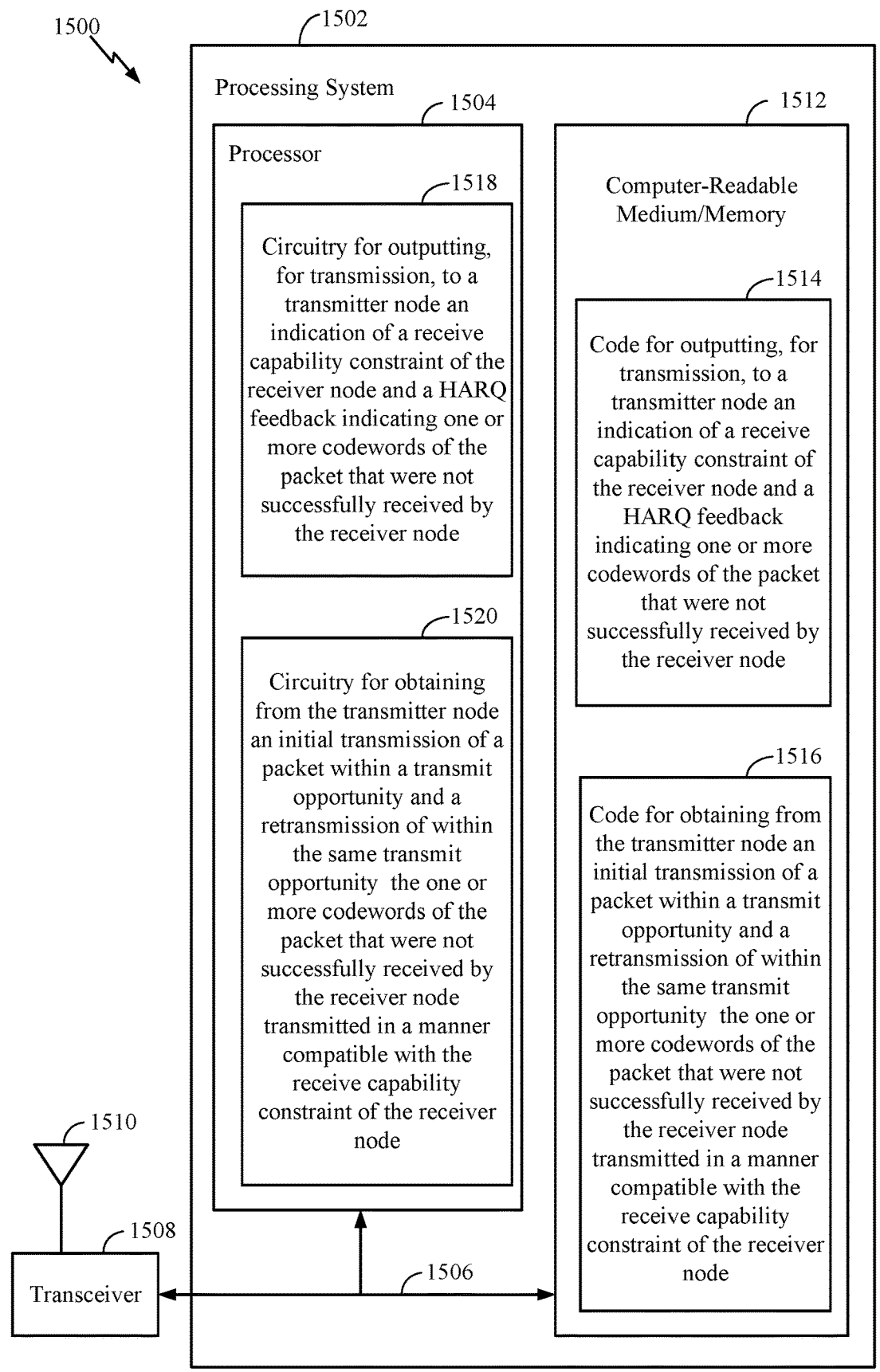
FIG. 15 illustrates a communications device that may include various components configured to perform operations for techniques disclosed herein, in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 7. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 7, or other operations for performing the various techniques discussed herein for retransmission of codewords of a packet that were not successfully received by a receiver node based on a receive capability constraint of the receiver node. In certain aspects, computer-readable medium/memory 1512 stores code 1514 for outputting, for transmission, and code 1516 for obtaining. The code 1514 for outputting, for transmission, may include code for outputting, for transmission to a transmitter node, an indication of at least one receive capability constraint of the receiver node and a HARQ feedback indicating one or more codewords of the packet that were not successfully received by the receiver node. The code 1516 for obtaining may include code for obtaining from the transmitter node an initial transmission of a packet within a transmit opportunity and a retransmission of within the same transmit opportunity at least the one or more codewords of the packet that were not successfully received by the receiver node transmitted in a manner compatible with the receive capability constraint of the receiver node.

The processor 1504 may include circuitry configured to implement the code stored in the computer-readable medium/memory 1512, such as for performing the operations illustrated in FIG. 7, as well as other operations for performing the various techniques discussed herein for retransmission of codewords of a packet that were not successfully received by a receiver node based on a receive capability constraint of the receiver node. For example, the processor 1504 includes circuitry 1518 for outputting, for transmission, and circuitry 1520 for receiving. The circuitry 1518 for outputting, for transmission, may include circuitry for outputting, for transmission to a transmitter node, an indication of at least one receive capability constraint of the receiver node and a HARQ feedback indicating one or more codewords of the packet that were not successfully received by the receiver node. The circuitry 1520 for obtaining may include circuitry for obtaining from the transmitter node an initial transmission of a packet within a transmit opportunity and a retransmission of within the same transmit opportunity at least the one or more codewords of the packet that were not successfully received by the receiver node transmitted in a manner compatible with the receive capability constraint of the receiver node.

In addition to the various aspects described above, aspects of specific combinations are within the scope of the disclosure, some of which are detailed below:

Aspect 1: A method for wireless communications by a transmitter node, comprising receiving an indication of at least a receive capability constraint of a receiver node; initially transmitting a packet to the receiver node within a transmit opportunity; receiving a hybrid automatic repeat request (HARQ) feedback indicating, at least, one or more codewords of the packet were not successfully received by the receiver node; retransmitting, within the same transmit opportunity, at least the one or more codewords of the packet that were not successfully received by the receiver node; and taking one or more actions to ensure that an over the air (OTA) time duration of the retransmission is compatible with the receive capability constraint of the receiver node.

Aspect 2: The method of Aspect 1, wherein the one or more actions are also taken to ensure that an OTA time duration of the initial transmission is compatible with the receive capability constraint of the receiver node.

Aspect 3: The method of any of Aspects 1-2, wherein the indication is received as part of a capability exchange between the transmitter node and the receiver node.

Aspect 4: The method of Aspect 3, wherein the receive capability constraint comprises a receive throughput agreed between the transmitter node and the receiver node based on the capability exchange.

Aspect 5: The method of Aspect 4, wherein the one or more actions comprise selecting one or more transmission parameters for the retransmission, based on at least one of the agreed receive throughput or a number of information bits, to ensure a sufficient number of encoded bits associated with the one or more codewords are retransmitted so that a throughput associated with the retransmission does not exceed the agreed receive throughput.

Aspect 6: The method of Aspect 5, wherein the selected one or more transmission parameters comprise at least one of modulation and coding scheme (MCS) or rate matching parameters.

Aspect 7: The method of any of Aspects 1-6, wherein the receive capability constraint comprises a medium access control (MAC) processing time of the receiver node and the one or more actions comprise adjusting the OTA time duration of the retransmission based on the MAC processing time.

Aspect 8: The method of any of Aspects 1-7, wherein the indication is received via an explicit signaling from the receiver node.

Aspect 9: The method of Aspect 7, further comprising receiving a peak MAC processing rate during a capability exchange between the transmitter node and the receiver node, wherein receiving the indication comprises deriving the MAC processing time based on at least on one of the peak MAC processing rate or a MAC protocol data unit (MPDU)-level block acknowledgment (BA) bitmap provided with the HARQ feedback.

Aspect 10: The method of Aspect 7, wherein the adjustment of the OTA time duration of the retransmission based on the MAC processing time comprises at least one of: adding parity bits to the one or more codewords in the retransmission; repeating one or more of the codewords in the retransmission; including, in the retransmission, one or more codewords that were successfully received by the receiver node as indicated by the HARQ feedback; or including one or more dummy codewords in the retransmission.

Aspect 11: The method of Aspect 10, further comprising, if the one or more dummy codewords are included in the retransmission, indicating a number of the one or more dummy codewords in a header of the retransmission.

Aspect 12: The method of any of Aspects 1-11, further comprising including new data in the retransmission; receiving a block acknowledgment (BA) from the receiver node and interpreting the BA as a request to perform an automatic repeat request (ARQ).

Aspect 13: The method of Aspect 12, wherein the receive capability constraint comprises a medium access control (MAC) processing time of the receiver node; and the indication further indicates a maximum size of the new data the transmitter node is allowed to include in the retransmission.

Aspect 14: The method of any of Aspects 1-13, wherein the receive capability constraint comprises a buffer size of the receiver node and the method further comprises: transmitting a new packet in a subsequent transmit opportunity; and ensuring the new packet transmission does comply with the buffer size of the receiver node.

Aspect 15: A method for wireless communications by a receiver node, comprising: transmitting, to a transmitter node, an indication of at least one receive capability constraint of the receiver node; receiving, from the transmitter node, an initial transmission of a packet within a transmit opportunity; transmitting a hybrid automatic repeat request (HARQ) feedback indicating one or more codewords of the packet that were not successfully received by the receiver node; and receiving a retransmission of, within the same transmit opportunity, at least the one or more codewords of the packet that were not successfully received by the receiver node transmitted in a manner compatible with the receive capability constraint of the receiver node.

Aspect 16: The method of Aspect 15, wherein the indication is transmitted as part of a capability exchange between the transmitter node and the receiver node.

Aspect 17: The method of Aspect 16, wherein the receive capability constraint comprises a receive throughput agreed between the transmitter node and the receiver node based on the capability exchange.

Aspect 18: The method of any of Aspects 15-17, wherein the receive capability constraint comprises a medium access control (MAC) processing time of the receiver node.

Aspect 19: The method of Aspect 18, wherein the receiver node explicitly signals the MAC processing time via the transmission of the indication.

Aspect 20: The method of Aspect 18, wherein: the transmission of the indication comprises signaling a peak MAC processing rate during a capability exchange between the transmitter node and the receiver node for the transmitter node to use to derive the MAC processing time and the method further comprises including a MAC protocol data unit (MPDU)-level block acknowledgment (BA) with the HARQ feedback for the transmitter node to use to derive the MAC processing time.

Aspect 21: The method of Aspect 18, wherein: the retransmission includes a header indicating a number of one or more dummy codewords included in the retransmission based on the MAC processing time; and the method further comprises processing the retransmission based on the indicated number.

Aspect 22: The method of Aspects 15-21, wherein the receiver node is provisioned with a buffer size sufficient to account for at least one of an estimated unblocked MAC protocol data unit (MPDU) size or new data included in the retransmission.

Aspect 23: The method of Aspect 22, further comprising sending a block acknowledgment (BA) to the transmitter node if the buffer size is exceeded.

Aspect 24: The method of Aspect 22, wherein: the receive capability constraint comprises a medium access control (MAC) processing time of the receiver node; and the indication further indicates a maximum size of the new data the transmitter node is allowed to include in the retransmission.

Aspect 25: The method of Aspect 22, further comprising transmitting, to the transmitter node, a second indication of the buffer size.

Aspect 26: The method of Aspect 22, further comprising: storing logarithmic likelihood ratios (LLRs) of failed codewords of the packet in the buffer; and taking one or more actions if a size of the stored LLRs of the failed codewords equals to or exceeds the buffer size, wherein: the one or more actions comprise at least one of storing any excess of the LLRs in memory other than the buffer or sending a block acknowledgment (BA) indicating the failed codewords.

Aspect 27: The method of Aspect 26, wherein the one or more actions comprise at least one of: storing any excess of the LLRs in memory other than the buffer; or sending a block acknowledgment (BA) indicating the failed codewords.

Aspect 28: A transmitter node, comprising: a receiver configured to receive an indication of at least a receive capability constraint of a receiver node; a transmitter configured to initially transmit a packet to the receiver node within a transmit opportunity, wherein the receiver is further configured to receive a hybrid automatic repeat request (HARQ) feedback indicating, at least, one or more codewords of the packet were not successfully received by the receiver node and the transmitter is further configured to retransmit, within the same transmit opportunity, at least the one or more codewords of the packet that were not successfully received by the receiver node; and a processing system configured to take one or more actions to ensure that an over the air (OTA) time duration of the retransmission is compatible with the receive capability constraint of the receiver node.

Aspect 29: A receiver node, comprising a transmitter configured to transmit, to a transmitter node, an indication of at least one receive capability constraint of the receiver node; and a receiver configured to receive, from the transmitter node, an initial transmission of a packet within a transmit opportunity, wherein the transmitter is further configured to transmit a hybrid automatic repeat request (HARQ) feedback indicating one or more codewords of the packet that were not successfully received by the receiver node and the receiver is further configured to receive a retransmission of, within the same transmit opportunity, at least the one or more codewords of the packet that were not successfully received by the receiver node transmitted in a manner compatible with the receive capability constraint of the receiver node.

Aspect 30: A transmitter node, comprising: means for receiving an indication of at least a receive capability constraint of a receiver node; means for initially transmitting a packet to the receiver node within a transmit opportunity; means for receiving a hybrid automatic repeat request (HARQ) feedback indicating, at least, one or more codewords of the packet were not successfully received by the receiver node; means for retransmitting, within the same transmit opportunity, at least the one or more codewords of the packet that were not successfully received by the receiver node; and means for taking one or more actions to ensure that an over the air (OTA) time duration of the retransmission is compatible with the receive capability constraint of the receiver node.

Aspect 31: A receiver node, comprising: means for transmitting, to a transmitter node, an indication of at least one receive capability constraint of the receiver node; means for receiving, from the transmitter node, an initial transmission of a packet within a transmit opportunity; means for transmitting a hybrid automatic repeat request (HARQ) feedback indicating one or more codewords of the packet that were not successfully received by the receiver node; and means for receiving a retransmission of, within the same transmit opportunity, at least the one or more codewords of the packet that were not successfully received by the receiver node transmitted in a manner compatible with the receive capability constraint of the receiver node.

Aspect 32: An apparatus for wireless communications by a transmitter node, comprising: an interface configured to obtain an indication of at least a receive capability constraint of a receiver node, output, for initial transmission, a packet to the receiver node within a transmit opportunity, obtain a hybrid automatic repeat request (HARQ) feedback indicating, at least, one or more codewords of the packet were not successfully received by the receiver node, and output, for retransmission within the same transmit opportunity, at least the one or more codewords of the packet that were not successfully received by the receiver node; and a processing system configure to take one or more actions to ensure that an over the air (OTA) time duration of the retransmission is compatible with the receive capability constraint of the receiver node.

Aspect 33: An apparatus for wireless communications by a receiver node, comprising: a processing system configured to generate an indication of at least one receive capability constraint of the receiver node; and an interface configured to output, for transmission to a transmitter node, the indication and obtain, from the transmitter node, an initial transmission of a packet within a transmit opportunity, wherein: the processing system is further configured to generate a hybrid automatic repeat request (HARQ) feedback indicating one or more codewords of the packet that were not successfully received by the receiver node; and the interface is further configured to output for transmission the HARQ feedback and obtain a retransmission of, within the same transmit opportunity, at least the one or more codewords of the packet that were not successfully received by the receiver node transmitted in a manner compatible with the receive capability constraint of the receiver node.

Aspect 34: A computer-readable medium for wireless communications by a transmitter node, comprising codes executable to obtain an indication of at least a receive capability constraint of a receiver node; output, for initial transmission, a packet to the receiver node within a transmit opportunity; obtain a hybrid automatic repeat request (HARQ) feedback indicating, at least, one or more codewords of the packet were not successfully received by the receiver node; output, for retransmission within the same transmit opportunity, at least the one or more codewords of the packet that were not successfully received by the receiver node; and take one or more actions to ensure that an over the air (OTA) time duration of the retransmission is compatible with the receive capability constraint of the receiver node.

Aspect 35: A computer-readable medium for wireless communications by a receiver node, comprising codes executable to: output, for transmission to a transmitter node, the indication; obtain, from the transmitter node, an initial transmission of a packet within a transmit opportunity; output for transmission a hybrid automatic repeat request (HARQ) feedback indicating one or more codewords of the packet that were not successfully received by the receiver node; and obtain a retransmission of, within the same transmit opportunity, at least the one or more codewords of the packet that were not successfully received by the receiver node transmitted in a manner compatible with the receive capability constraint of the receiver node.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a wireless node, a wireless communications node, a wireless device, a wireless communications device, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 600 of FIG. 6 and/or operations 700 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for selecting, means for adding, means for taking one or more actions, means for repeating, means for including, means for interpreting, means for ensuring, means for processing and means for storing may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® CD disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a transmitter node, comprising:
   receiving an indication of at least a receive capability constraint of a receiver node, wherein the indication is received as part of a capability exchange between the transmitter node and the receiver node, and the receive capability constraint comprises a receive throughput agreed between the transmitter node and the receiver node based on the capability exchange;
   initially transmitting a packet to the receiver node within a transmit opportunity;
   receiving a hybrid automatic repeat request (HARQ) feedback indicating, at least, one or more codewords of the packet were not successfully received by the receiver node;
   retransmitting, within the same transmit opportunity, at least the one or more codewords of the packet that were not successfully received by the receiver node; and
   taking one or more actions to ensure that an over the air (OTA) time duration of the retransmission is compatible with the receive capability constraint of the receiver node.

2. The method of claim 1, wherein the one or more actions are also taken to ensure that an OTA time duration of the initial transmission is compatible with the receive capability constraint of the receiver node.

3. The method of claim 1, wherein the one or more actions comprise:
   selecting one or more transmission parameters for the retransmission, based on at least one of the agreed receive throughput or a number of information bits, to ensure a sufficient number of encoded bits associated with the one or more codewords are retransmitted so that a throughput associated with the retransmission does not exceed the agreed receive throughput.

4. The method of claim 3, wherein the selected one or more transmission parameters comprise at least one of modulation and coding scheme (MCS) or rate matching parameters.

5. The method of claim 1, wherein:
   the receive capability constraint comprises a medium access control (MAC) processing time of the receiver node; and
   the one or more actions comprise adjusting the OTA time duration of the retransmission based on the MAC processing time.

6. The method of claim 1, wherein the indication is received via an explicit signaling from the receiver node.

7. The method of claim 5, further comprising:
   receiving a peak MAC processing rate during a capability exchange between the transmitter node and the receiver node, wherein:
   receiving the indication comprises deriving the MAC processing time based on at least on one of the peak MAC processing rate or a MAC protocol data unit (MPDU)-level block acknowledgment (BA) bitmap provided with the HARQ feedback.

8. The method of claim 5, wherein the adjustment of the OTA time duration of the retransmission based on the MAC processing time comprises at least one of:
   adding parity bits to the one or more codewords in the retransmission;
   repeating one or more of the codewords in the retransmission;
   including, in the retransmission, one or more codewords that were successfully received by the receiver node as indicated by the HARQ feedback; or including one or more dummy codewords in the retransmission.

9. The method of claim 8, further comprising, if the one or more dummy codewords are included in the retransmission, indicating a number of the one or more dummy codewords in a header of the retransmission.

10. The method of claim 1, further comprising:
including new data in the retransmission;
receiving a block acknowledgment (BA) from the receiver node; and
interpreting the BA as a request to perform an automatic repeat request (ARQ).

11. The method of claim 10, wherein:
the receive capability constraint comprises a medium access control (MAC) processing time of the receiver node; and
the indication further indicates a maximum size of the new data the transmitter node is allowed to include in the retransmission.

12. The method of claim 1, wherein the receive capability constraint comprises a buffer size of the receiver node and the method further comprises:
transmitting a new packet in a subsequent transmit opportunity; and
ensuring the new packet transmission does comply with the buffer size of the receiver node.

13. A method for wireless communications by a receiver node, comprising:
transmitting, to a transmitter node, an indication of at least one receive capability constraint of the receiver node, wherein the indication is transmitted as part of a capability exchange between the transmitter node and the receiver node, and the receive capability constraint comprises a receive throughput agreed between the transmitter node and the receiver node based on the capability exchange;
receiving, from the transmitter node, an initial transmission of a packet within a transmit opportunity;
transmitting a hybrid automatic repeat request (HARQ) feedback indicating one or more codewords of the packet that were not successfully received by the receiver node; and
receiving a retransmission of, within the same transmit opportunity, at least the one or more codewords of the packet that were not successfully received by the receiver node transmitted in a manner compatible with the receive capability constraint of the receiver node.

14. The method of claim 13, wherein the receive capability constraint comprises a medium access control (MAC) processing time of the receiver node.

15. The method of claim 14, wherein the receiver node explicitly signals the MAC processing time via the transmission of the indication.

16. The method of claim 14, wherein:
the transmission of the indication comprises signaling a peak MAC processing rate during a capability exchange between the transmitter node and the receiver node for the transmitter node to use to derive the MAC processing time; and
the method further comprises including a MAC protocol data unit (MPDU)-level block acknowledgment (BA) with the HARQ feedback for the transmitter node to use to derive the MAC processing time.

17. The method of claim 14, wherein:
the retransmission includes a header indicating a number of one or more dummy codewords included in the retransmission based on the MAC processing time; and the method further comprises processing the retransmission based on the indicated number.

18. The method of claim 13, wherein the receiver node is provisioned with a buffer size sufficient to account for at least one of an estimated unblocked MAC protocol data unit (MPDU) size or new data included in the retransmission.

19. The method of claim 18, further comprising:
sending a block acknowledgment (BA) to the transmitter node if the buffer size is exceeded.

20. The method of claim 18, wherein:
the receive capability constraint comprises a medium access control (MAC) processing time of the receiver node; and
the indication further indicates a maximum size of the new data the transmitter node is allowed to include in the retransmission.

21. The method of claim 18, further comprising transmitting, to the transmitter node, a second indication of the buffer size.

22. The method of claim 18, further comprising:
storing logarithmic likelihood ratios (LLRs) of failed codewords of the packet in the buffer; and
taking one or more actions if a size of the stored LLRs of the failed codewords equals to or exceeds the buffer size, wherein:
the one or more actions comprise at least one of:
storing any excess of the LLRs in memory other than the buffer; or
sending a block acknowledgment (BA) indicating the failed codewords.

23. The method of claim 22, wherein the one or more actions comprise at least one of:
storing any excess of the LLRs in memory other than the buffer; or
sending a block acknowledgment (BA) indicating the failed codewords.

24. A transmitter node, comprising:
a receiver configured to receive an indication of at least a receive capability constraint of a receiver node, wherein the receiver is configured to receive the indication as part of a capability exchange between the transmitter node and the receiver node, and the receive capability constraint comprises a receive throughput agreed between the transmitter node and the receiver node based on the capability exchange;
a transmitter configured to initially transmit a packet to the receiver node within a transmit opportunity, wherein:
the receiver is further configured to receive a hybrid automatic repeat request (HARQ) feedback indicating, at least, one or more codewords of the packet were not successfully received by the receiver node; and
the transmitter is further configured to retransmit, within the same transmit opportunity, at least the one or more codewords of the packet that were not successfully received by the receiver node; and
a processing system configured to take one or more actions to ensure that an over the air (OTA) time duration of the retransmission is compatible with the receive capability constraint of the receiver node.

25. A receiver node, comprising:
a transmitter configured to transmit, to a transmitter node, an indication of at least one receive capability constraint of the receiver node, wherein the transmitter is configured to transmit the indication as part of a capability exchange between the transmitter node and the receiver node, and the receive capability constraint comprises a receive throughput agreed between the transmitter node and the receiver node based on the capability exchange; and a receiver configured to receive, from the transmitter node, an initial transmission of a packet within a transmit opportunity, wherein:

the transmitter is further configured to transmit a hybrid automatic repeat request (HARQ) feedback indicating one or more codewords of the packet that were not successfully received by the receiver node; and the receiver is further configured to receive a retransmission of, within the same transmit opportunity, at least the one or more codewords of the packet that were not successfully received by the receiver node transmitted in a manner compatible with the receive capability constraint of the receiver node.

* * * * *